United States Patent [19]

Bae et al.

[11] Patent Number: 5,555,667

[45] Date of Patent: Sep. 17, 1996

[54] POSITION SENSING LIGHT DEVICE FOR A FISHING ROD

[76] Inventors: Tae H. Bae; Sang Y. Bae; Sang I. Bae, all of 6898 Old Annapolis Rd., Linthicum, Md. 21090

[21] Appl. No.: 496,198

[22] Filed: Jun. 28, 1995

[51] Int. Cl.⁶ .................................................. A01K 97/12
[52] U.S. Cl. .............................. 43/17; 43/17.5; 362/120; 362/802
[58] Field of Search ........................... 43/17, 17.5, 18.1, 43/25; 362/191, 120, 802

[56] References Cited

U.S. PATENT DOCUMENTS

| | | | |
|---|---|---|---|
| 3,882,629 | 5/1975 | Kaye | 43/17 |
| 3,918,191 | 11/1975 | Williamson | 43/17 |
| 4,479,321 | 10/1984 | Welstead | 43/17 |
| 5,083,249 | 1/1992 | Chen | 362/191 |

*Primary Examiner*—Jeanne M. Elpel

[57] ABSTRACT

A position sensing light device for detachably mounting to an outer portion of a fishing rod, includes a gradually tapered attachment for adjustably mounting to the outer portion of the fishing rod, a housing containing a mercury battery and tightly connecting to the attachment, and a transparent cap containing a light bulb and a mercury switch, whereby illumination of the light bulb indicates to a user when a fish is attempting to take the bait from the fishing line.

7 Claims, 1 Drawing Sheet

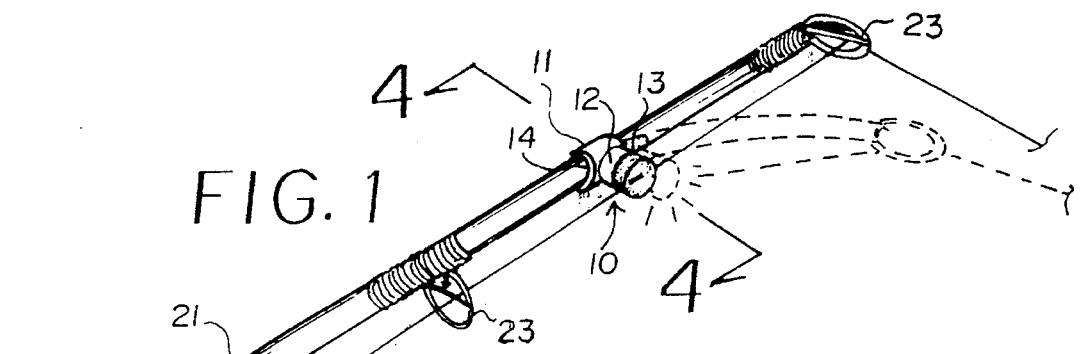
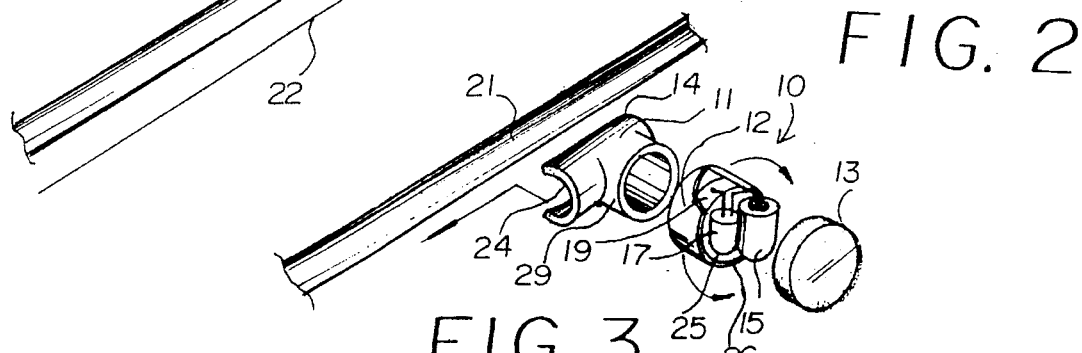
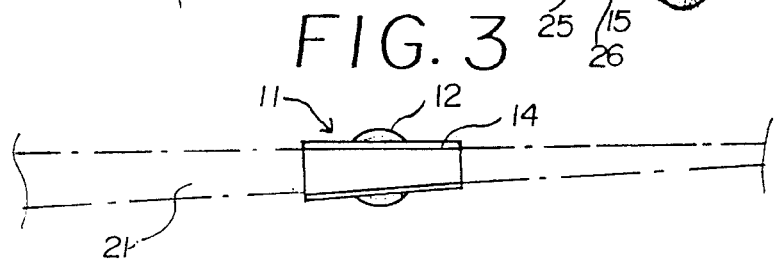
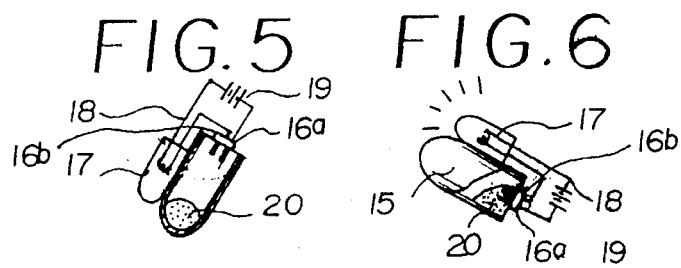

POSITION SENSING LIGHT DEVICE FOR A FISHING ROD

BACKGROUND OF THE INVENTION

1. Field of the Invention

The present invention relates to a position sensing light device for a fishing rod and, more particularly, to an improved fishing light device adjustably and detachably mounted to an outer portion of a fishing rod for illuminating light when a fish is attempting to take the bait.

2. Description of Related Art

Various types of night fishing signaling devices are known in the art. Generally, many fish feed primarily between sunset and sunrise. Most of the time, it is difficult or impossible to see the end of the fishing rod when fishing at night. Therefore, devices have been previously proposed for lighting a lamp in response to a biting of a fish on the fishing line of the fishing rod. However, such conventional night fishing signaling devices have been bulky and complex in construction and have a large housing size, thereby causing interference with the normal fishing techniques.

Some of the conventional fishing light devices are difficult to attach to a fishing rod, and are not sensible to indicate a strike on the line. Furthermore, such conventional devices are complicated in structure, so that it is difficult to replace old batteries with the new batteries. Such devices are shown in U.S. Pat. Nos. 3,882,629 to Kaye and 4,479,321 to Welstead.

SUMMARY OF THE INVENTION

Accordingly, it is an object of the present invention to provide a position sensing light device for attachably mounting on a fishing rod, which eliminates the above problems encountered with the conventionally lighted fishing rod.

Another object of the present invention is to provide a position sensing light device for use with a fishing rod, which includes a gradually tapered attachment for easily attaching to or detaching from the fishing rod, a mercury battery, and a light bulb and a mercury switch disposed within a transparent cap, whereby the device can quickly indicate a strike on the fishing line and be easily installed on and removed from the fishing rod.

A further object of the present invention is to provide a position sensing light device which does not interfere with normal fishing techniques and does not contact either the fishing reel or the fishing line.

Still another object of the present invention is to provide a positioning sensing light device for attachably mounting to a fishing rod, which is simple in structure, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a position sensing light device which is detachably attached to an outer portion of a fishing rod. The device includes a gradually tapered opening attachment for adjustably and detachably mounting onto the outer portion of the fishing rod, a housing containing a mercury cell battery and tightly connecting to the attachment, and a transparent cap containing a light bulb and a mercury switch, whereby when a fish is attempting to take the bait from the fishing line, the position light device mounted on the outer portion of the fishing rod illuminates the light bulb therein to indicate the presence of a fish nearby.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a perspective view showing a position sensing light device according to a preferred embodiment of the present invention on a fishing rod;

FIG. 2 is an exploded perspective view of the position sensing light device according to the preferred embodiment of the present invention;

FIG. 3 is a rear elevational view of the position sensing light device according to the preferred embodiment of the present invention, showing a gradually tapered attachment;

FIG. 4 is an enlarged cross-sectional view of the position sensing light device, as taken along the line 4—4 in FIG. 1;

FIG. 5 is a front elevational view showing a mercury switch in an off-position usable in the position sensing light device according to the preferred embodiment of the present invention; and FIG. 6 is a front elevational view showing an on-position of the mercury switch.

DETAILED DESCRIPTION OF THE PREFERRED EMBODIMENTS

Referring now in detail to the drawings for the purpose of illustrating preferred embodiments of the present invention, the position sensing light device 10 for a fishing rod 21 is examplarily shown in FIGS. 1 and 2. The devices 10 include a T-shaped attachment 11 for easily and adjustably attaching to or detaching from the fishing rod 21, a housing 12 containing a mercury battery 19 and tightly assemblable with the attachment 11, and a transparent cap 13 containing a light bulb 17 and a mercury switch 15 and tightly assemblable with the housing 12.

As shown in FIGS. 3 and 4, the T-shaped attachment 11 has a gradually tapered cylindrical configuration 14 having an opening 24 for slidably attaching to and removing from the outer portion of the fishing rod 21. This increases the sensibility to detect the striking of a fishing line 22 and avoids interference with handling operation of the fishing rod 21. At the lower portion of the attachment 11, a tube 29 having a diameter smaller than that of the mercury battery 19 is disposed.

The housing 12 having a tubular configuration, includes a conducting base partition 25 for positioning the mercury battery 19 at one side thereof and for attaching the light bulb 17 and the mercury switch 15 at the other side thereof. The conducting base partition 25 contains a pair of apertures 28 for pushing out the old mercury battery 19, for example using a pin or a needle (not shown), in order to insert the new mercury battery. Thereafter, the tubular housing 12 is to be rotably assembled with the tube 29 of the T-shaped attachment 11 with tightness since the diameter of the tube 29 is smaller than that of the housing 12 as shown in FIG. 4. The transparent cap 13 is tightly assembled with the housing 12 through the use of a snap-on type of an arrangement 26,27, for example (FIG. 4).

As shown in FIGS. 5 and 6, from the mercury battery 19 there is a conducting wire 18 which connects the light bulb 17 and a first contact 16a of the mercury switch 15. The light bulb 12 is also connected with a second contact 16b of the mercury switch 15. When a mercury bubble 20 disposed within the mercury switch 15 contacts both the first and second contacts 16a and 16b, there is an activation of the light bulb 17. This will generally result in a blinking illumination of the light bulb 17 which alerts a user that a fish is attempting to take the bait.

On the other hand, if a fishing line 22 in eyelets 23 does not strike, i.e. no fish is biting the bait, the mercury bubble 20 does not contact the first and second contacts 16a, 16b since the position of the rod remains substantially the same. When the mercury bubble 20 does not provide a connection between the first and second contacts 16a, 16b, there is no activation of the light bulb 17 as shown in FIG. 5.

The position sensing light device 10 for a fishing rod 21 according to the preferred embodiment of the present invention is assembled and operates as follows. In assembling, after the new cell battery 19 is put into the housing 12, the housing 12 including the light bulb 17 and the mercury switch 15 is rotably assembled with the T-shaped attachment 11. The cap 13 is tightly assembled with the housing 12 by the snap-on arrangement 26,27 (FIG. 4). At this time, the position sensing light device 10 is detachably slided onto the outer portion of the fishing rod 21 as shown in FIG. 1.

When the fish is attempting to take the bait, the fishing line 22 and fishing rod 21 are moved, as shown by the dotted lines in FIG. 1, which cause the mercury bubble 20 to move to contact the first and second contacts 16a and 16b. At this time, the light bulb 17 illuminates as shown in FIG. 6. Due to the illumination of the light bulb 17, the fisherman is alerted to observe the fish attempting to take the bait.

In order to replace the old mercury battery 19, the attachment 11 is disassembled from the housing 12, and a pin or a needle is used to push out the old battery from the housing 12 through the pair of apertures 28. Thereafter, the new mercury battery is put into the housing 12 by hand. Accordingly, the position sensing light device 10 according to the present invention is simple in structure, inexpensive to manufacture, durable in use, and refined in appearance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A position sensing light device for a fishing rod, comprising:

a T-shaped attachment for detachably mounting to said fishing rod, said T-shaped attachment including a gradually tapered opening cylinder defining an upper portion thereof for tightly and slidably clamping the fishing rod, and a tube including defining a lower portion thereof;

a tubular housing rotably assemblable with said tube of the T-shaped attachment, said tubular housing including a conducting base partition a cell battery, a light bulb and a mercury switch said cell battery slidably received on one side of said conducting base partition; and a transparent cap tightly assemblable with said tubular housing covering the light bulb and the mercury switch, whereby said light bulb is illuminated in response to said mercury switch when a fish is attempting to take a bait.

2. The position sensing light device of claim 1, wherein said conducting base partition includes a pair of apertures for removing the cell battery by using a needle or a pin.

3. The position sensing light device of claim 1, wherein a diameter of said tube of said T-shaped attachment is smaller than a diameter of said tubular housing so as to achieve tight assembling of said T-shaped attachment and said tubular housing.

4. The position sensing light device of claim 1, wherein said tubular housing and said transparent cap include a snap-on arrangement for tightly assembling with each other.

5. The position sensing light device of claim 1, wherein said mercury switch contains a mercury bubble, and first and second contacts for connecting with said cell battery and said light bulb.

6. The position sensing light device of claim 5, wherein said light bulb is illuminated when said mercury bubble contacts said first and second contacts.

7. The position sensing light device of claim 1, wherein said mercury switch is positioned adjacent to said light bulb, said device including a pair of conducting wires for connecting said cell battery, said light bulb, and said mercury switch, for illuminating said light bulb.

\* \* \* \* \*